US007792537B2

(12) United States Patent
Wilborn et al.

(10) Patent No.: US 7,792,537 B2
(45) Date of Patent: *Sep. 7, 2010

(54) SCHEDULING NEIGHBOR CELL MEASUREMENTS FOR MULTIPLE WIRELESS COMMUNICATION SYSTEMS

(75) Inventors: Thomas B. Wilborn, San Diego, CA (US); Arunava Chaudhuri, San Diego, CA (US); David Arun Pandian, San Diego, CA (US); Thomas Nelson Bailey, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/852,924

(22) Filed: Sep. 10, 2007

(65) Prior Publication Data

US 2008/0002604 A1   Jan. 3, 2008

Related U.S. Application Data

(63) Continuation of application No. 10/730,702, filed on Dec. 4, 2003, now Pat. No. 7,330,732.

(51) Int. Cl.
*H04B 7/00* (2006.01)
*H04B 7/216* (2006.01)
*H04B 7/212* (2006.01)
*H04W 36/00* (2009.01)
*H04W 4/00* (2009.01)
*H04M 1/00* (2006.01)
*H04M 11/04* (2006.01)

(52) U.S. Cl. .................. 455/502; 455/525; 455/439; 455/522; 455/521; 455/404.2; 455/553.1; 370/331; 370/337; 370/335; 370/342; 370/347; 370/320

(58) Field of Classification Search .............. 455/553.1, 455/502, 525, 439, 522, 521, 404.2; 370/320, 370/342, 331, 337, 335, 347
See application file for complete search history.

(56) References Cited

U.S. PATENT DOCUMENTS

| 6,308,066 | B1 | 10/2001 | Ranta et al. | |
|---|---|---|---|---|
| 6,438,117 | B1 * | 8/2002 | Grilli et al. | 370/331 |
| 6,725,039 | B1 * | 4/2004 | Parmar et al. | 455/436 |
| 6,963,745 | B2 * | 11/2005 | Singh et al. | 455/437 |
| 2003/0002525 | A1 * | 1/2003 | Grilli et al. | 370/465 |

(Continued)

*Primary Examiner*—Yuwen Pan
*Assistant Examiner*—Bobbak Safaipour
(74) *Attorney, Agent, or Firm*—Eric Ho

(57) ABSTRACT

Techniques for scheduling measurements for cells in multiple (e.g., GSM and W-CDMA) wireless communication systems are described. GSM neighbor cells are categorized based on a number of states. The states are prioritized in a manner to achieve good performance. The GSM neighbor cells are thus assigned different priorities depending on their states. W-CDMA neighbor cells are prioritized relative to the states for GSM cells. All W-CDMA neighbor cells can be assigned the same state, given the same priority, and considered as "one" W-CDMA cell in the scheduling. A cell in the GSM or W-CDMA system is selected based on the priorities of the neighbor cells, and the selected cell is scheduled for measurement in the next available frame. The highest-ranking GSM or W-CDMA cell for each idle frame is thus granted use of that idle frame for measurement.

25 Claims, 10 Drawing Sheets

U.S. PATENT DOCUMENTS

2003/0114158 A1* 6/2003 Soderbacka et al. ......... 455/436
2003/0119550 A1* 6/2003 Rinne et al. ................. 455/553
2004/0029587 A1 2/2004 Hulkkonen et al.
2005/0117547 A1* 6/2005 Lu ............................. 370/335
2006/0111110 A1* 5/2006 Schwarz et al. ............. 455/439

* cited by examiner

T = TDMA frame for TCH
A = TDMA frame for SACCH/T
I = Idle TDMA frame

F = TDMA frame for FCCH (tone)
S = TDMA frame for SCH (RFN & BSIC)
B = TDMA frame for BCCH
C = TDMA frame for CCCH (e.g., PCH)

SCHEDULING NEIGHBOR CELL MEASUREMENTS FOR MULTIPLE WIRELESS COMMUNICATION SYSTEMS

CLAIM OF PRIORITY UNDER 35 U.S.C. §120

The present application for patent is a Continuation and claims priority to patent application Ser. No. 10/730,702 entitled "SCHEDULING NEIGHBOR CELL MEASUREMENTS FOR MULTIPLE WIRELESS COMMUNICATION SYSTEMS" filed Dec. 4, 2003, now allowed; which claims the benefit of provisional U.S. Application Ser. No. 60/493,535, entitled "Scheduling Neighbor Cell Measurements," filed Aug. 7, 2003; both assigned to the assignee hereof and hereby expressly incorporated by reference herein.

BACKGROUND

I. Field

The present invention relates generally to communication, and more specifically to techniques for scheduling measurements for neighbor cells in multiple wireless communication systems.

II. Background

In a Global System for Mobile Communications (GSM) system, a terminal communicates with one base station at any given moment but periodically makes measurements for neighbor base stations. The base station that the terminal communicates with is referred to as the "serving" cell, and the neighbor base stations are referred to as "neighbor" cells. The measurements are made so that the terminal can determine if there are any cells better than the current serving cell. This may be the case, for example, if the terminal is mobile and moves from cell to cell. If a better cell is found, as indicated by the measurements, then the terminal would be handed from the current serving cell over to the better cell, which would then become the new serving cell.

GSM provides gaps in the transmissions on the downlink and uplink to facilitate measurement for neighbor cells. These gaps have a predetermined duration and are spaced apart by a predetermined time interval. The terminal uses the gaps to make measurements for the neighbor cells and then reports the measurement results back to the serving cell.

A multi-mode terminal is capable of communicating with multiple wireless communication systems, such as a GSM system and a Wideband Code Division Multiple Access (W-CDMA) system. If the multi-mode terminal is in communication with the GSM system, then the terminal would make measurements for GSM neighbor cells and may also need to make measurements for W-CDMA neighbor cells. The gaps in transmission in the GSM system are originally intended for use to make measurements for GSM cells. Thus, using these gaps for other purposes, such as to make measurements for W-CDMA cells, may degrade the performance of the measurements for GSM cells.

There is therefore a need in the art for techniques to schedule measurements for neighbor cells in multiple wireless communication systems.

SUMMARY

Techniques for scheduling measurements for cells in multiple wireless communication systems (e.g., GSM and W-CDMA systems) are described herein. To achieve good performance, GSM and W-CDMA neighbor cells are prioritized to determine which cell to measure in each frame available for measurement (e.g., each idle frame in GSM).

The GSM neighbor cells are categorized based on a number of states. Each state is associated with information indicating, for example, whether or not timing information and cell identification have been obtained for a cell. The states are prioritized in a manner to achieve good performance. The GSM neighbor cells are thus assigned different priorities depending on their states. The W-CDMA neighbor cells are prioritized relative to the states for the GSM neighbor cells. Since W-CDMA cells are stateless, as described below, all of the W-CDMA neighbor cells can be assigned the same state, given the same priority, and considered as "one" W-CDMA cell in the measurement scheduling. A cell in the GSM or W-CDMA system is selected based on the priorities of the neighbor cells, and the selected cell is scheduled for measurement in the next idle frame. The highest-ranking GSM or W-CDMA cell for each idle frame is thus granted use of that idle frame for measurement.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
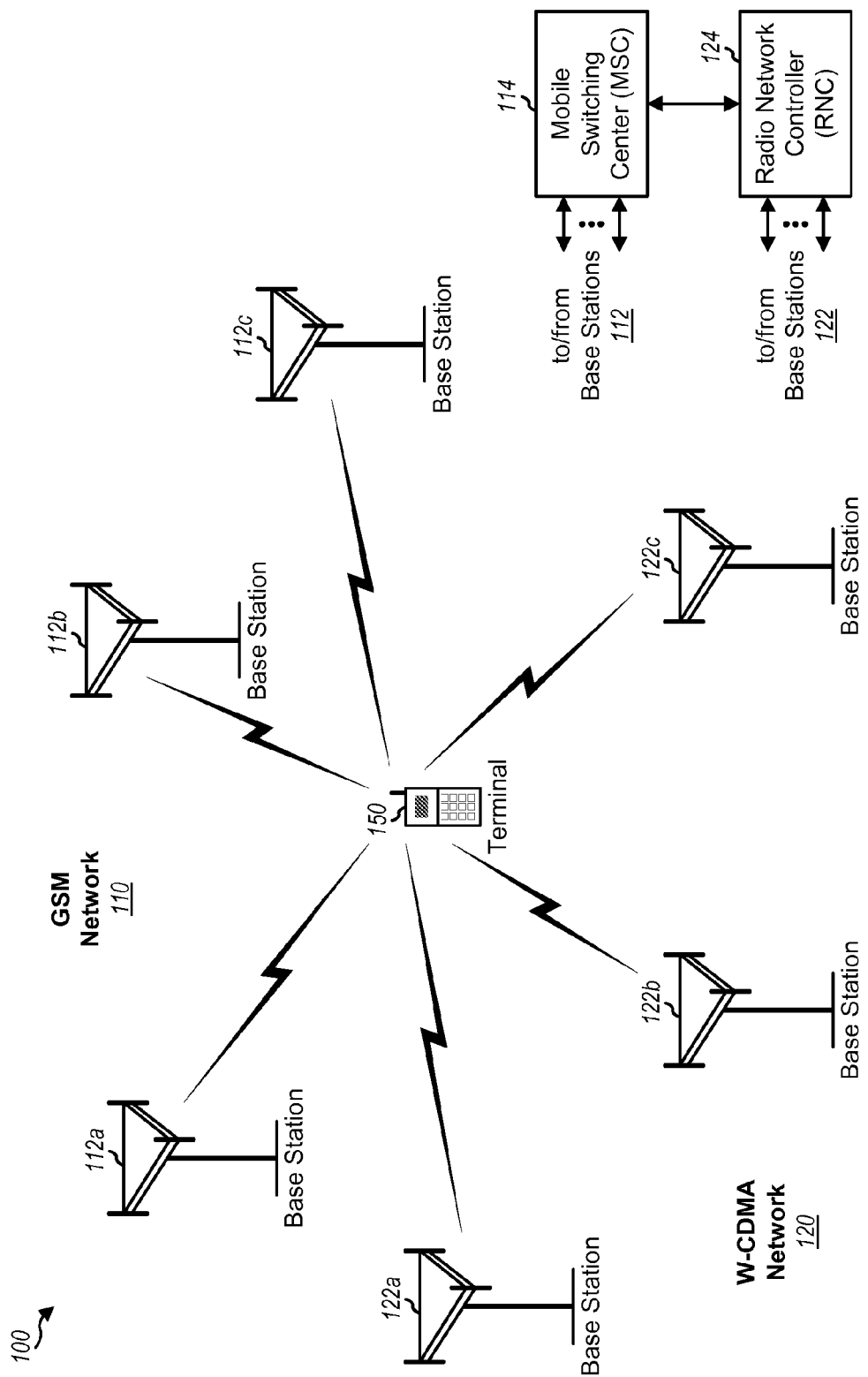
FIG. 1 shows a GSM network and a W-CDMA network.

FIG. 1 shows a public land mobile network (PLMN) 100 that includes a GSM network 110 and a W-CDMA network 120, which is also referred to as a Universal Terrestrial Radio Access Network (UTRAN). GSM is a radio access technology (RAT) that can provide voice service and low to medium rate packet data service. GSM networks are widely deployed throughout the world. W-CDMA is a new radio access technology that can provide enhanced services and capabilities (e.g., higher data rates, concurrent voice and data calls, and so on). GSM network 110 and W-CDMA network 120 are thus two radio access networks employing different radio access technologies (GSM and W-CDMA) but belonging to the same PLMN.

GSM network 110 and W-CDMA network 120 each include multiple cells, where a "cell" can refer to a base station and/or its coverage area, depending on the context in which the term is used. GSM network 110 includes base stations 112 that provide communication for terminals within the GSM network. A mobile switching center (MSC) 114 couples to base stations 112 and provides coordination and control for these base stations. GSM network 110 may support General Packet Radio System (GPRS), which provides packet data service for GSM terminals. W-CDMA network 120 includes base stations 122 that provide communication for terminals within the W-CDMA network. A radio network controller (RNC) 124 couples to base stations 122 and provides coordination and control for these base stations. MSC 114 communicates with RNC 124 to support interworking between the GSM and W-CDMA networks.

A multi-RAT terminal 150 (e.g., a dual-mode cellular phone) has the capability to communicate with GSM network 110 and W-CDMA network 120, typically with one network at any given moment. This capability allows a subscriber/user to obtain the performance advantages of W-CDMA and the coverage benefits of GSM with the same terminal. Terminal 150 may be fixed or mobile and may also be referred to as a user equipment (UE), a mobile station (MS), a mobile equipment (ME), a wireless communication device, or some other terminology.

GSM uses different types of channels to send different types of data. In particular, traffic or user-specific data is sent on traffic channels, which are assigned to terminals for the duration of a call. Broadcast, control, and other overhead data is sent on control channels.

Figure 2:
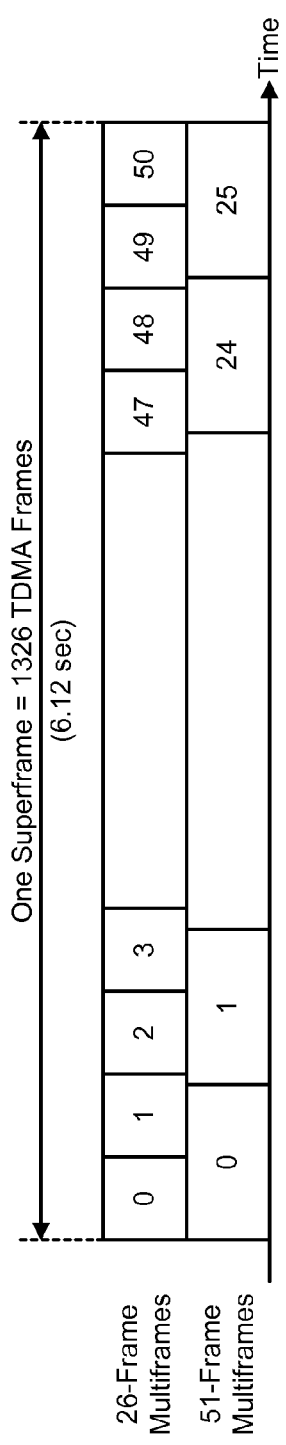
FIG. 2 shows a framing structure in GSM.

FIG. 2 shows a framing structure defined by GSM. The timeline for data transmission is divided into superframes. Each superframe has a duration of 6.12 seconds and includes 1326 TDMA (Time Division Multiple Access) frames. A superframe can be partitioned into either 51 26-frame multiframes (which are mainly used for traffic channels) or 26 51-frame multiframes (which are mainly used for control channels).

Figure 3:
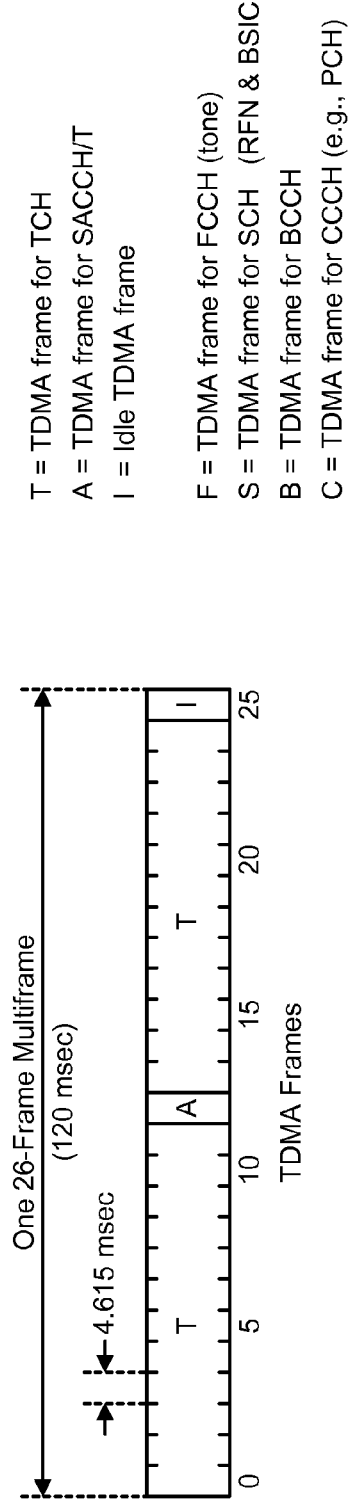
FIG. 3 shows an organization for traffic and control channels in GSM.

FIG. 3 shows an exemplary channel organization for the traffic and control channels in GSM. The traffic channels use the 26-frame multiframe structure. Each 26-frame multiframe includes 26 TDMA frames, which are labeled as TDMA frames 0 through 25. Each TDMA frame has a duration of 4.615 msec. The traffic channels are sent in TDMA frames 0 through 11 and TDMA frames 13 through 24 of each 26-frame multiframe. A control channel (SACCH/T) is sent in TDMA frame 12 and is used to carry inband signaling such as (1) measurement reports sent by terminals on the uplink and (2) timing advances for the terminals sent by the base station on the downlink. No data is sent in the idle frame (I), which is used by the terminals to make measurements for neighbor cells. Although not shown in FIG. 3 for simplicity, each TDMA frame is further partitioned into 8 time slots. Each active terminal/user is assigned one time slot for the duration of a call, and user-specific data for the terminal is sent in the assigned time slot. The terminal may measure received signal strength (i.e., received signal power) for the neighbor cells in the unassigned time slots.

The control channels use the 51-frame multiframe structure. Each 51-frame multiframe includes 51 TDMA frames, which are labeled as TDMA frames 0 through 50. The control channels for GSM include a frequency correction channel (FCCH), a synchronization channel (SCH), a broadcast control channel (BCCH), and a common control channel (CCCH). The FCCH carries a tone that allows a terminal to obtain frequency and coarse timing information for a transmitting cell. The FCCH is sent in TDMA frames 0, 10, 20, 30 and 40 of each 51-frame multiframe. The SCH carries (1) a reduced TDMA frame number (RFN) that is used by a terminal to synchronize its timing and frame numbering and (2) a base transceiver station identity code (BSIC) that identifies the transmitting cell. The SCH is sent in TDMA frames 1, 11, 21, 31 and 41 of each 51-frame multiframe. The BCCH carries system information and is sent in TDMA frames 2, 3, 4 and 5 of each 51-frame multiframe. The CCCH carries control information and is also used to implement a paging channel (PCH), which carries paging messages for idle terminals.

The channel organization for the traffic and control channels in GSM is described in detail in a document 3GPP TS 05.01, which is publicly available.

A GSM system operates on one or more frequency bands. Each frequency band covers a specific range of frequencies and is divided into a number of 200 kHz RF channels. Each RF channel is identified by a specific ARFCN (absolute radio frequency channel number). For example, the GSM 900 frequency band includes ARFCNs 1 through 124, the GSM 1800 frequency band includes ARFCNs 512 through 885, and the GSM 1900 frequency band includes ARFCNs 512 through 810.

Each GSM cell transmits traffic and overhead data on a set of RF channels that is assigned to that cell by a network operator. To reduce inter-cell interference, GSM cells located near each other are assigned different sets of RF channels, so that the transmissions from these cells do not interfere with one another. Each GSM cell transmits the FCCH, SCH, and BCCH on one or more of the RF channels assigned to that cell. An RF channel used to transmit these control channels is referred to as a BCCH carrier.

Each GSM cell that supports Release 97 or Release 98 version of the GSM standard broadcasts a BCCH allocation list (which is also referred to herein as a neighbor cell list) that can contain up to 32 GSM neighbor cells. Each GSM cell that supports Release 99 or later version of the GSM standard and each 3GPP cell broadcasts a neighbor cell list that can contain up to 32 GSM cells and up to 64 W-CDMA neighbor cells distributed across up to three W-CDMA frequencies. The neighbor cell list contains the ARFCN of the BCCH carrier and the BSIC for each GSM neighbor cell in the list. A terminal obtains the neighbor cell list from its GSM serving cell and performs measurements for the GSM and W-CDMA neighbor cells included in this list, as specified by 3GPP.

A terminal that is in communication with a GSM serving cell periodically makes measurement for cells in the neighbor cell list to look for better cells. The neighbor cells may use the same RAT as that of the serving cell (i.e., GSM) or a different RAT (e.g., W-CDMA). Because of the frequency division multiplex nature of GSM, the neighbor cells transmit on different RF channels than those of the GSM serving cell. Thus, in order to make measurements for the neighbor cells, whether of the same or different RAT, the terminal needs to tune its RF receiver away from the RF channel for the traffic channels for the GSM serving cell. While tuned away, the terminal cannot receive data from or transmit data to the GSM serving cell. GSM creates idle frames to provide the terminal with some time to tune away from the GSM serving cell, make measurements for the neighbor cells, and tune back to the serving cell, all without losing data from downlink/uplink transmissions.

GSM requires a terminal to periodically report the received signal strength and cell identifier (BSIC) for each cell in the neighbor cell list while the terminal is operating in a GSM dedicated mode (for a circuit-switched voice or data call) or a GPRS packet transfer mode (for a packet data call). In GSM, the cells are not synchronized and the timing of each GSM cell is unlikely to be aligned with the timing of other GSM cells. GSM thus further requires the terminal to maintain the timing of some of the GSM neighbor cells relative to the GSM serving cell. By maintaining synchronization to these neighbor cells, the terminal can be quickly handed over to one of these cells if and when the network issues a handover command.

Figure 4:
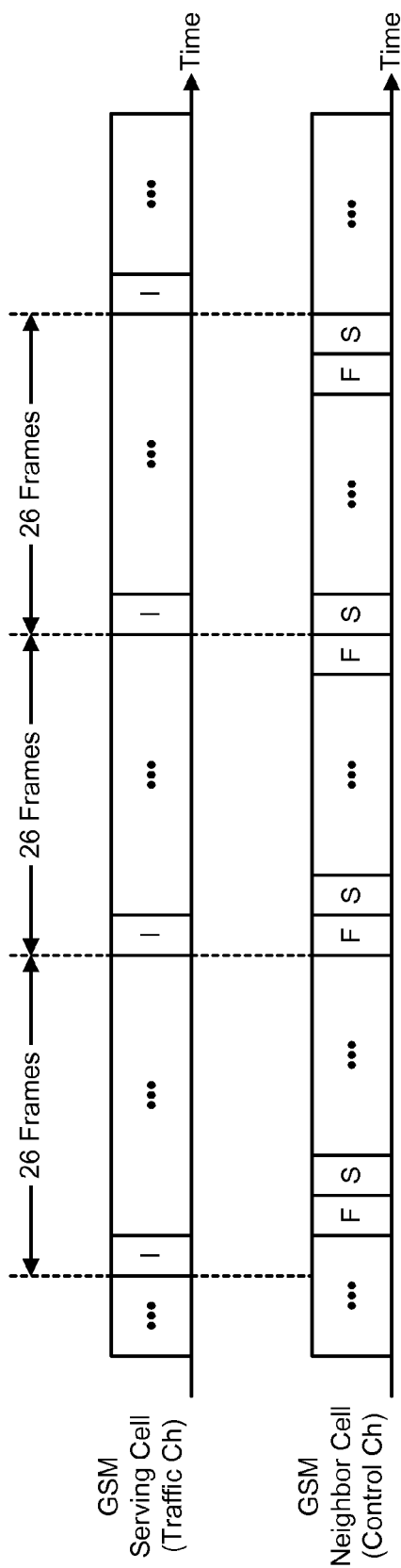
FIG. 4 shows a timeline for making measurement for a GSM neighbor cell.

FIG. 4 illustrates a timeline for making measurement for a GSM neighbor cell. Because GSM cells are not synchronized, the 51-frame multiframes used for the control channels of the GSM neighbor cell may start at an arbitrary point in time relative to the 26-frame multiframes used for the traffic channels of the GSM serving cell. The 26-frame multiframe and the 51-frame multiframe are defined such that the FCCH and SCH for the GSM neighbor cell appear to slide past the idle frames for the GSM serving cell, as illustrated in FIG. 4. At least two TDMA frames are needed to complete the measurement for the GSM neighbor cell—one TDMA frame to process the FCCH to obtain a coarse estimate of the timing and frequency of the GSM neighbor cell and another TDMA frame to decode the SCH to obtain a more accurate timing estimate, the RFN, and the BSIC for the neighbor cell. Since the FCCH and SCH are transmitted every 10 TDMA frames, 11 idle frames are needed in the worst case scenario to find and process the FCCH and SCH when the timing of the GSM neighbor cell is not known.

Each W-CDMA cell continuously transmits a pilot that is scrambled with a pseudo-random number (PN) sequence assigned to that cell. The pilot of a W-CDMA cell can be processed to determine the timing of the W-CDMA cell, which is commonly given by the position of the PN sequence (i.e., the PN position) for the cell relative to a PN counter maintained by the terminal. The terminal also typically measures the signal-to-noise ratio (SNR) of the pilot in order to ascertain the likelihood of the measured pilot being an actual W-CDMA signal instead of noise. Since the W-CDMA pilot is continuous, the terminal can sample the received signal during an idle frame, store the data samples in a buffer, and process the data samples off-line (as opposed to real-time during the idle frame).

Figure 5:
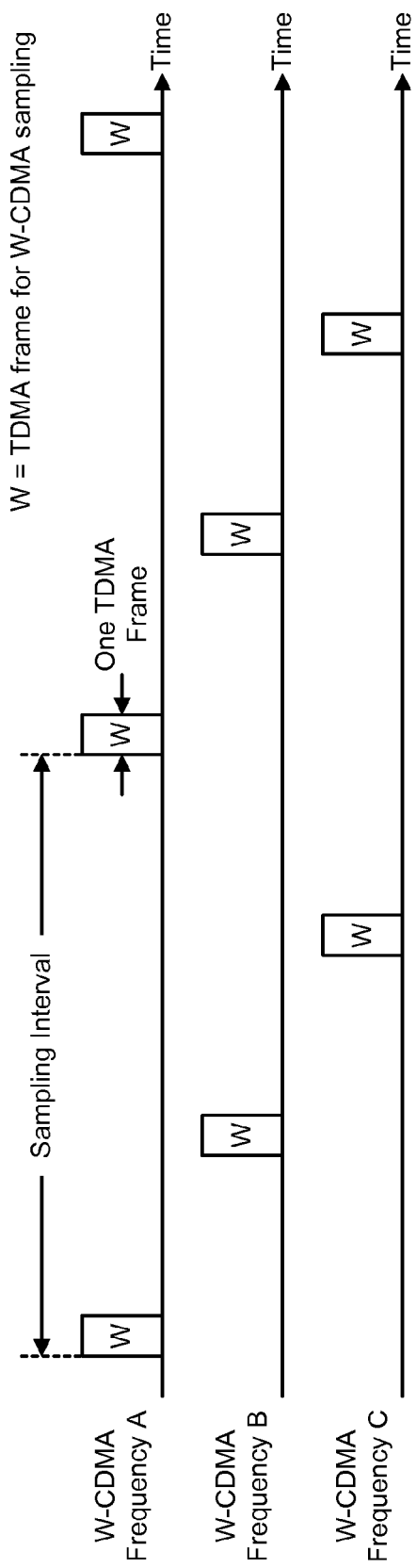
FIG. 5 shows a timeline for making measurement for W-CDMA neighbor cells.

FIG. 5 illustrates a timeline for making measurement for W-CDMA neighbor cells. In W-CDMA, multiple W-CDMA cells can transmit concurrently on the same frequency. The terminal can thus process the same data samples collected for a given W-CDMA frequency to make measurements for all W-CDMA cells transmitting on that frequency. W-CDMA cells are stateless in that no information needs to be maintained to indicate what has been gathered or what still needs to be gathered in order to complete the measurements for these cells (which is not the case for GSM cells). In order to comply with the requirements imposed by 3GPP, the terminal needs to obtain data samples for each W-CDMA frequency at a particular minimum rate (e.g., every seven idle frames for an exemplary design). The sampling interval is the time duration between consecutive idle frames in which data samples are required for one W-CDMA frequency. If the neighbor cell list contains W-CDMA cells at multiple W-CDMA frequencies, then the terminal can perform the sampling for these frequencies in a staggered and interlaced manner, as shown in FIG. 5. A W-CDMA scheduler that is responsible for processing W-CDMA neighbor cells can request an idle frame periodically (e.g., every L-th idle frame) to capture data samples for W-CDMA processing. The GSM network sends a 3G_SEARCH_PRIO flag to indicate the priority the terminal should give to measurements for W-CDMA cells versus GSM cells. The value for the parameter L is determined by the number of W-CDMA frequencies, the design of the terminal, the priority of the W-CDMA neighbor cells versus the GSM neighbor cells, and so on.

The terminal is typically able to measure only one GSM neighbor cell or one W-CDMA frequency in each idle frame because of its short duration. The terminal thus needs to measure the neighbor cells in an intelligent manner in order to comply with the requirements imposed by 3GPP. One such requirement is for the terminal to identify a strong cell within five seconds after being switched on.

Figure 6:
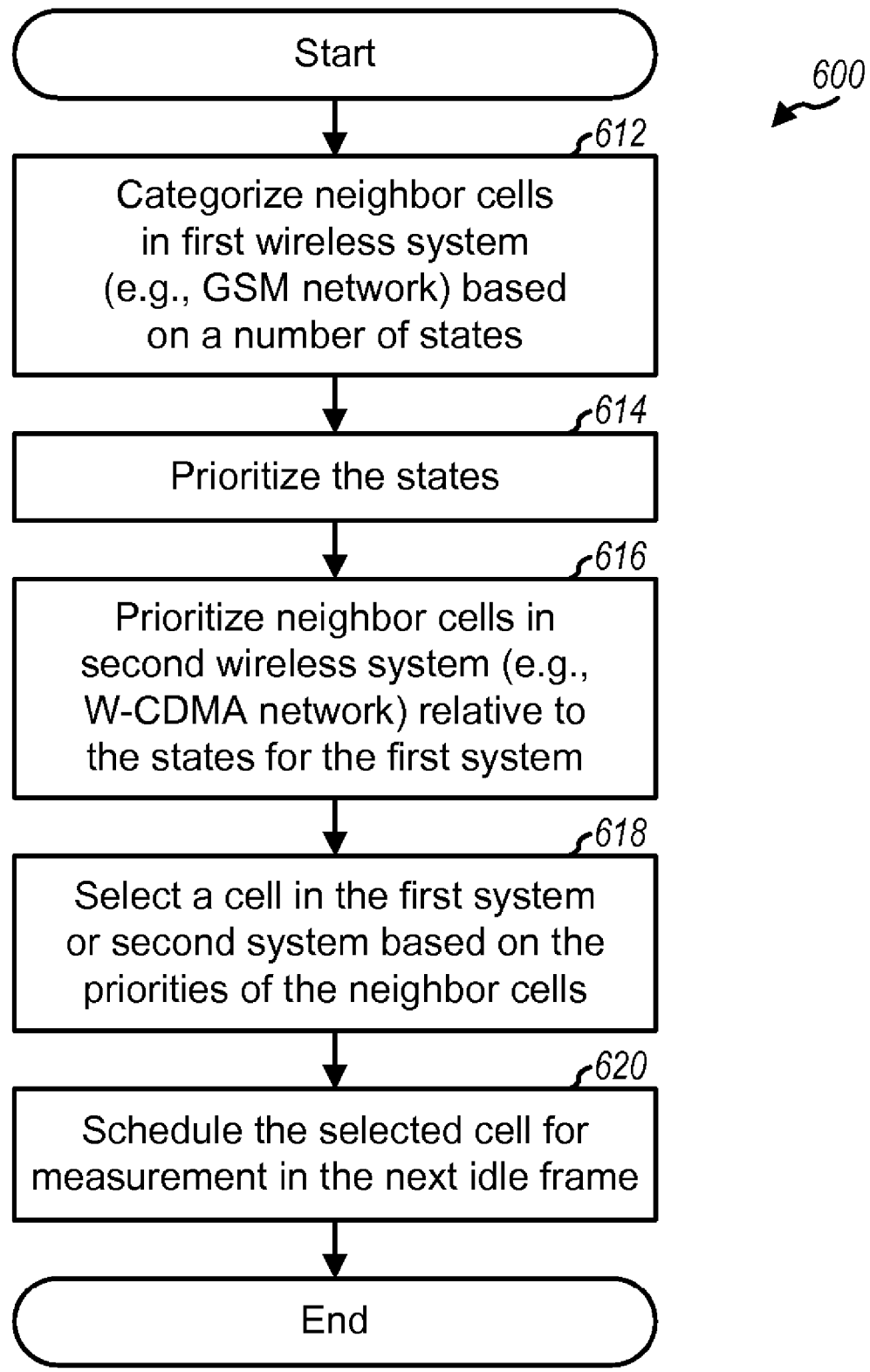
FIG. 6 shows a process for scheduling measurements for cells in multiple wireless communication systems.

FIG. 6 shows a flow diagram of an overall process 600 for scheduling measurements for cells in multiple wireless communication systems (e.g., GSM and W-CDMA networks). In order to comply with 3GPP requirements and achieve good performance, the GSM and W-CDMA neighbor cells are prioritized to determine which cell to measure in the next idle frame (or the next available frame).

The GSM neighbor cells are categorized based on a number of states (block 612). Each state is associated with information indicating, for example, whether or not timing information and cell identification have been obtained for a cell, as described below. The states are prioritized in a manner to achieve good performance (block 614). The GSM neighbor cells are thus assigned different priorities depending on their states. The W-CDMA neighbor cells are prioritized relative to the states for the GSM neighbor cells (block 616). All of the W-CDMA neighbor cells can, in effect, belong to the same state and be assigned the same priority since W-CDMA cells are stateless, as described above. A W-CDMA request from the W-CDMA scheduler may be viewed as "one" W-CDMA neighbor cell by scheduling process 600. This one W-CDMA cell would represent all of the W-CDMA neighbor cells operating at the W-CDMA frequency covered by the W-CDMA request. The GSM cells and the W-CDMA cell can be ranked based on their assigned priorities. A cell in the GSM or W-CDMA network is selected based on the priorities of the neighbor cells (block 618). The selected cell is scheduled for measurement in the next idle frame (block 620). The highest-ranking GSM or W-CDMA cell for each idle frame is thus granted use of the idle frame for measurement.

The GSM neighbor cells are effectively categorized into different groups, one group for each state, based on the state information for these cells. These groups/states are assigned different priorities in the measurement scheduling. The groups/states may be defined in various manners. Two exemplary schemes are described below.

Figure 7:
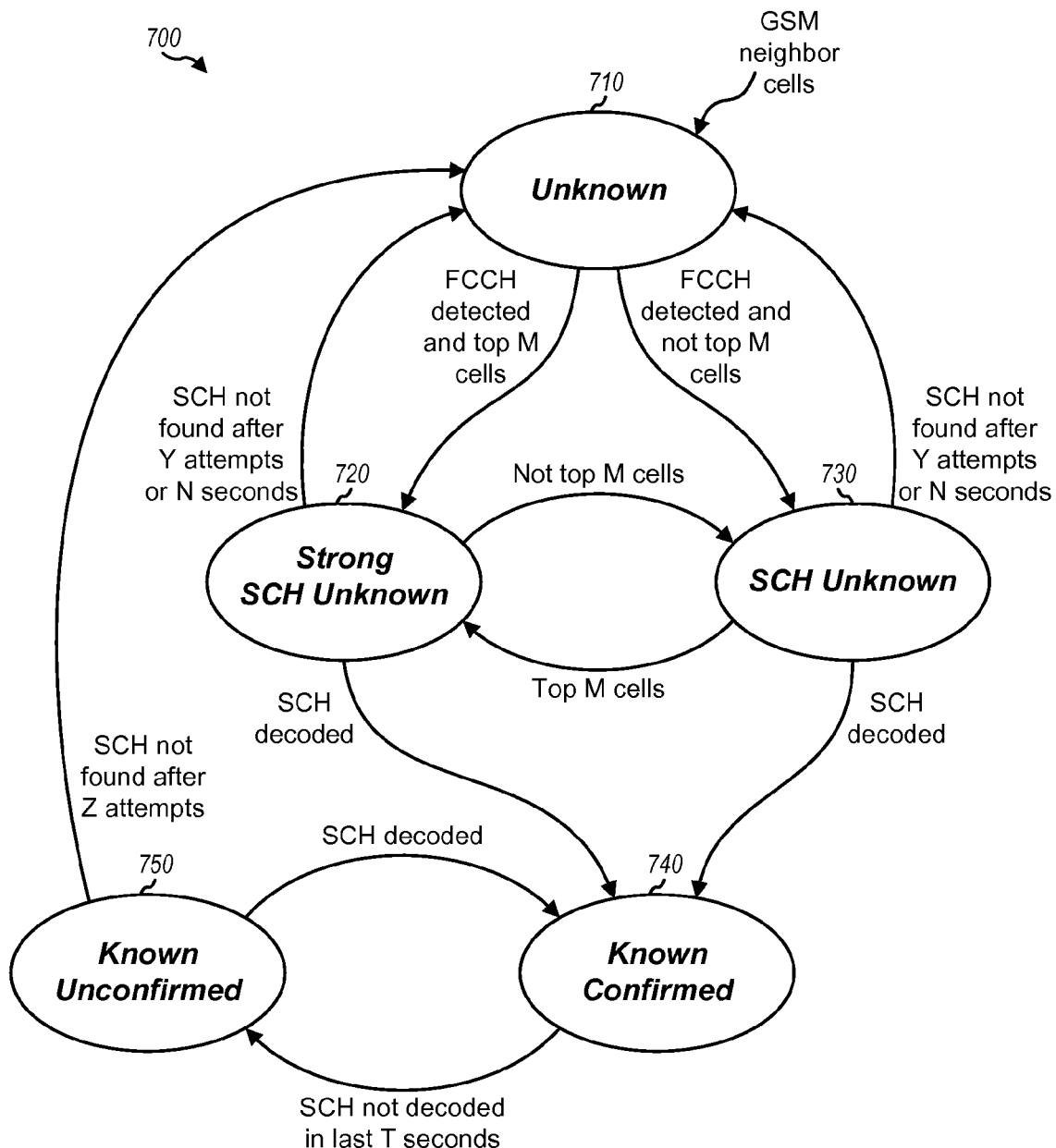
FIG. 7 shows a scheme for categorizing GSM neighbor cells into five states.

FIG. 7 shows a state diagram of a first scheme 700 for categorizing the GSM neighbor cells into five states. These states are defined as follows:

Unknown state 710—includes GSM neighbor cells for which the FCCH and SCH have not been processed.

Strong SCH Unknown state 720—includes GSM neighbor cells for which the FCCH has been detected and which are among the M strongest received GSM neighbor cells (i.e., the top M cells).

SCH Unknown state 730—includes GSM neighbor cells for which the FCCH has been detected and which are not among the top M cells.

Known Confirmed state 740—includes GSM neighbor cells for which the FCCH has been detected and the SCH has been decoded within the last T seconds.

Known Unconfirmed state 750—includes GSM neighbor cells for which the FCCH has been detected and the SCH was decoded more than T seconds ago.

In an embodiment, M=6 and T=10. Other values may also be used for M and T.

For scheme 700, the GSM neighbor cells are initialized to Unknown state 710. Each GSM neighbor cell can thereafter transition from state to state (or equivalently, from group to group) depending on measurement results for that cell and/or other pertinent information. The transition for one GSM neighbor cell is as follows. This cell initially starts in Unknown state 710. If the FCCH for the cell is detected, then the cell transitions to Strong SCH Unknown state 720 if the received signal strength for the cell is among the top M cells and to SCH Unknown state 730 otherwise. The cell transitions from state 720 to state 730 if it falls out of the top M cells, and from state 730 to state 720 if it becomes one of the top M cells.

From states 720 and 730, the cell transitions back to state 710 if the SCH is not found or cannot be decoded after Y attempts or N seconds. The parameters Y and N are selected to provide the desired performance. For example, the parameter Y can be set to three to give the terminal three attempts at decoding the SCH. The cell transitions from states 720 and 730 to Known Confirmed state 740 if the SCH is decoded. The cell remains in state 740 if the SCH is decoded within T seconds and transitions to Known Unconfirmed state 750 otherwise. From state 750, the cell transitions back to state 740 if the SCH is decoded and to state 710 if the SCH is not found or cannot be decoded after Z attempts. The parameter Z may be set, for example, to three to give the terminal three attempts at decoding the SCH.

In an embodiment, GSM neighbor cells in Strong SCH Unknown state 720 are given a priority of 1.0, cells in SCH Unknown state 730 are given a priority of 2.0, cells in Known Unconfirmed state 750 are given a priority of 3.0, and cells in Unknown state 710 are given a priority of 4.0, where a lower priority number corresponds to higher priority. GSM neighbor cells in Known Confirmed state 740 do not need to be measured and are not assigned a priority. In an embodiment, the W-CDMA neighbor cells are given a priority of 2.5, which is higher than Known Unconfirmed state 750 but lower than SCH Unknown state 730.

Figure 8:
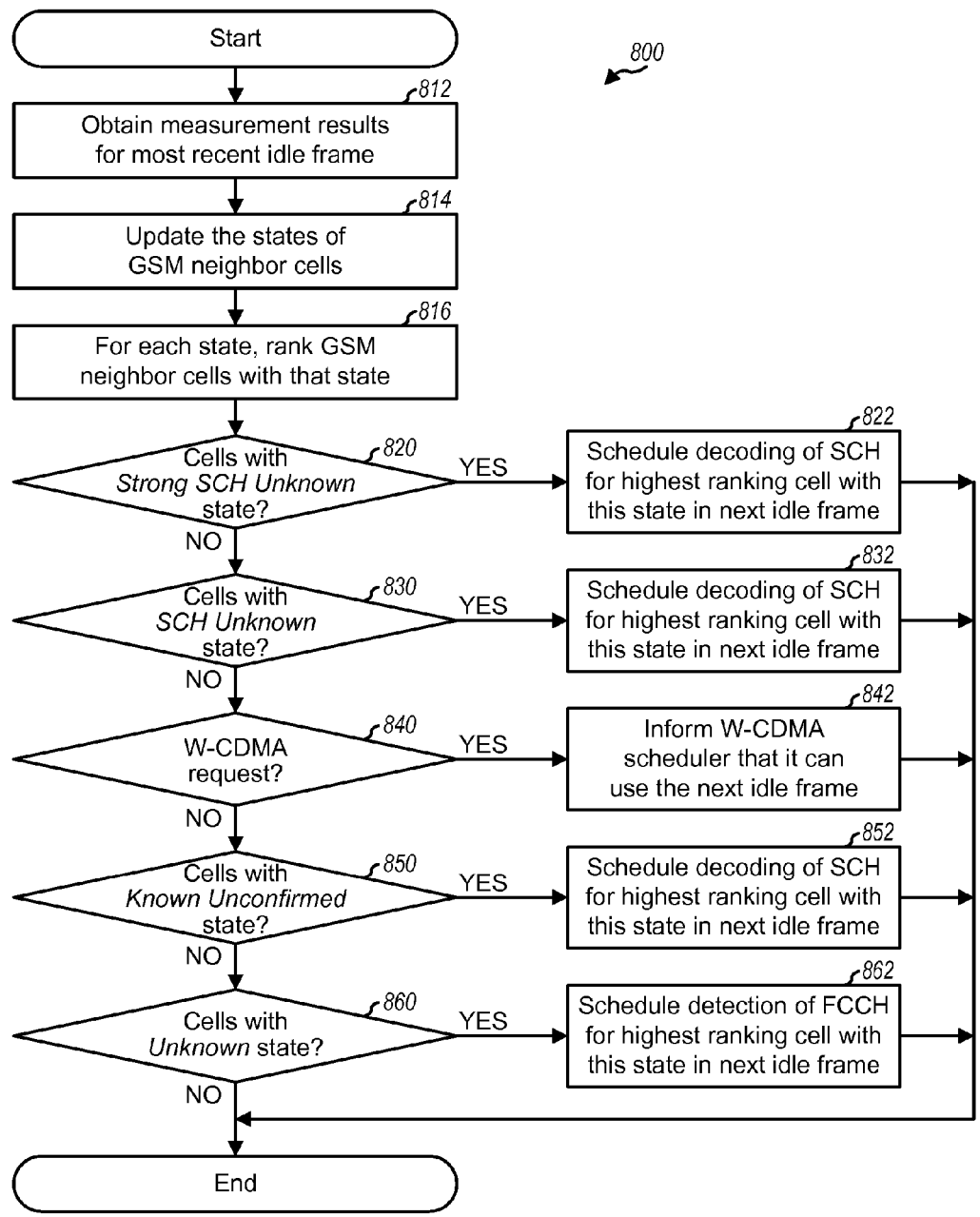
FIG. 8 shows a process for scheduling measurements for GSM and W-CDMA neighbor cells based on the states shown in FIG. 7.

FIG. 8 shows a flow diagram of a process 800 for scheduling measurements for GSM and W-CDMA neighbor cells. Process 800 is based on the state diagram shown in FIG. 7 and may be performed after each idle frame.

Initially, measurement results for the most recent idle frame are obtained (block 812). The measurement results may indicate, for example, whether the FCCH has been detected or the SCH has been decoded for the GSM neighbor cell scheduled in the most recent idle frame. The states of the GSM neighbor cells are updated based on the measurement results and other pertinent information (block 814). For example, the GSM neighbor cell scheduled in the most recent idle frame may transition to (1) Strong SCH Unknown state 720 or SCH Unknown state 730 if the FCCH has been detected, (2) Known Confirmed state 740 if the SCH has been decoded, or (3) Unknown state 710 if the SCH cannot be decoded after Y or Z attempts have been made. The states of the GSM neighbor cells may also change even though these cells were not selected for measurement in the most recent idle frame. For example, GSM neighbor cells in Known Confirmed state 740 may transition to Known Unconfirmed state 750 if T seconds have elapsed since the last SCH decoding. GSM neighbor cells may also transition between state 720 and state 730 based on their received signal strength.

For each state, GSM neighbor cells with that state are ranked (block 816). The ranking may be based on received signal strength, the amount of elapsed time since the last measurement, cell timing, and so on. The received signal strength for GSM neighbor cells may be measured during the unassigned time slots in the TDMA frames used for the traffic channels. Various ranking schemes may be used to rank the GSM neighbor cells for each state. In one ranking scheme, the cells in a given state (e.g., Strong SCH Unknown state 720, SCH Unknown state 730, or Known Unconfirmed state 750) are scheduled for measurement in sequential order, with the cell last scheduled for measurement being ranked the highest and the cell most recently scheduled being ranked the lowest. In another ranking scheme, for a given state, the cell with the highest received signal strength is ranked the highest and the cell with the lowest received signal strength is ranked the lowest. A cell may also be ranked higher if its timing is known and its SCH is aligned with the next idle frame. An exemplary ranking scheme for GSM neighbor cells in Unknown state 710 is described below.

A determination is then made whether there are any GSM neighbor cells in Strong SCH Unknown state 720 with an SCH frame potentially aligned with the next idle frame (block 820). State 720 has the highest priority for process 800. Whether or not a given GSM neighbor cell has an SCH frame potentially aligned to the next idle frame may be determined based on the coarse timing obtained from the detected FCCH for the cell. If the answer is 'yes' for block 820, then the highest-ranking cell that meets the conditions in block 820 is scheduled for SCH decoding in the next idle frame (block 822).

If the answer is 'no' for block 820, then a determination is made whether there are any GSM neighbor cells in SCH Unknown state 730 with an SCH frame potentially aligned with the next idle frame (block 830). State 730 has the second highest priority for process 800. If the answer is 'yes' for block 830, then the highest-ranking cell that meets the conditions in block 830 is scheduled for SCH decoding in the next idle frame (block 832).

If the answer is 'no' for block 830, then a determination is made whether there is a pending W-CDMA request, which has the third highest priority (block 840). If the answer is 'yes', then the W-CDMA scheduler is informed that it can use the next idle frame to capture data samples for W-CDMA processing (block 842).

If the answer is 'no' for block 840, then a determination is made whether there are any GSM neighbor cells in Known Unconfirmed state 750 with an SCH frame aligned with the next idle frame (block 850). State 750 has the fourth highest priority for process 800. If the answer is 'yes' for block 850, then the highest-ranking cell that meets the conditions in block 850 is scheduled for SCH decoding in the next idle frame (block 852).

If the answer is 'no' for block 850, then a determination is made whether there are any GSM neighbor cells in Unknown state 710, which has the lowest priority for process 800 (block 860). If the answer is 'yes', then the highest-ranking cell with this state is scheduled for FCCH detection in the next idle frame (block 862). Process 800 terminates after blocks 822, 832, 842, 852 and 862 and after a 'no' at block 862.

For process 800, the pending W-CDMA request may be assigned higher priority (e.g., higher than Strong SCH Unknown state 720) if the 3G_SEARCH_PRIO flag is set.

The network sets this flag to indicate that W-CDMA neighbor cells should be given higher priority than GSM neighbor cells for measurements.

Figure 9:
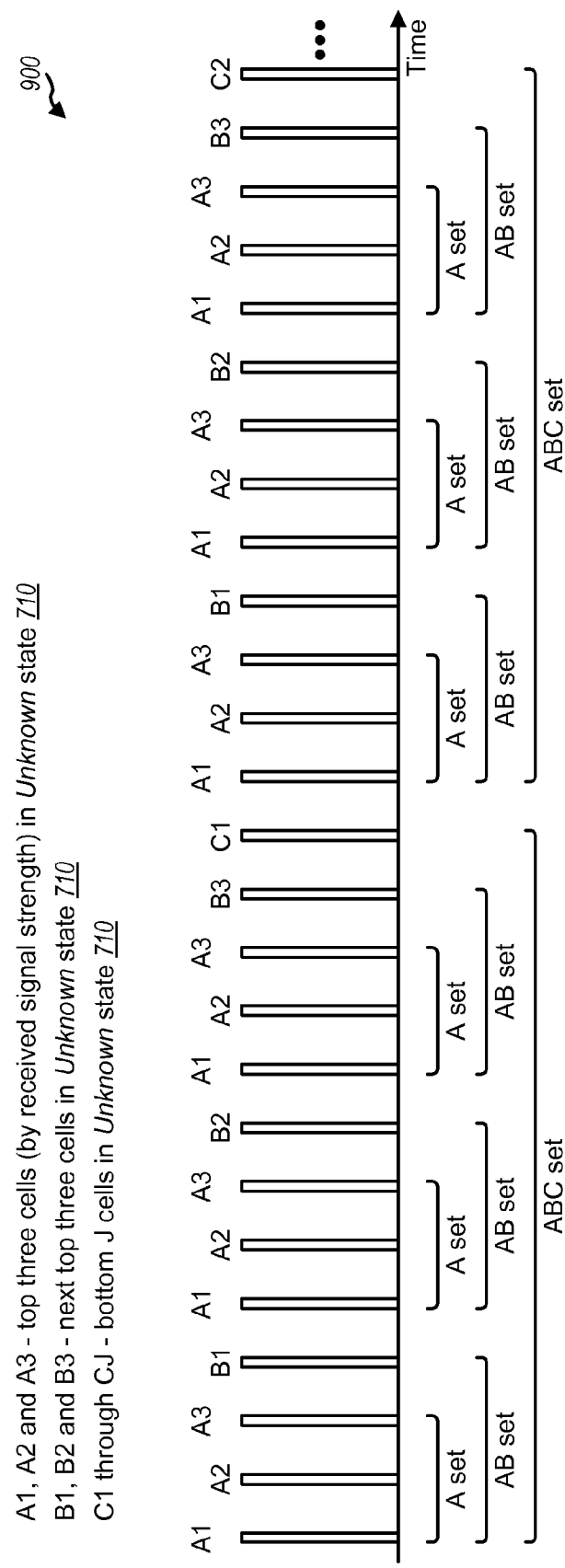
FIG. 9 shows a scheme for ranking GSM neighbor cells with an Unknown state.

FIG. 9 shows an exemplary ranking scheme 900 for the GSM neighbor cells in Unknown state 710. For ranking scheme 900, the three strongest GSM neighbor cells with this state are labeled as A1, A2, and A3, the next three strongest cells with this state are labeled as B1, B2, and B3, and the remaining cells with this state are labeled as C1 through CJ. For ranking scheme 900, one B cell is scheduled for measurement after all three A cells have been scheduled, and one C cell is scheduled after all three B cells have been scheduled. As shown in FIG. 9, the three A cells (A1, A2 and A3) are scheduled for measurement sequentially, followed by the highest-ranking B cell (B1), followed by the three A cells, followed by the next highest-ranking B cell (B2), followed by the three A cells, followed by the lowest-ranking B cell (B3), followed by the highest-ranking C cell (C1), and so on. The three B cells are thus interlaced with three sets of A cells, and the J C cells are interlaced with J sets of A and B cells.

Figure 10:
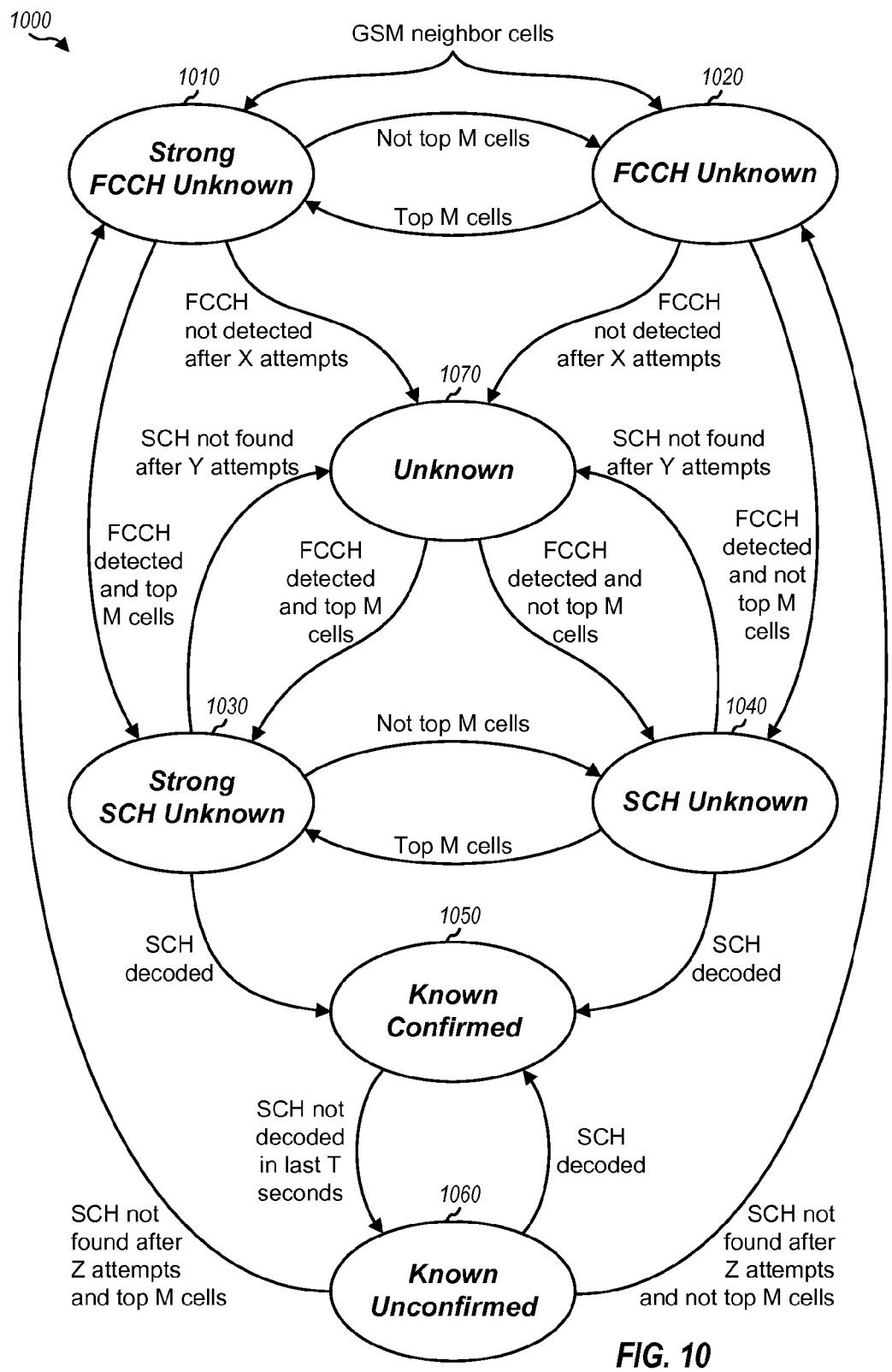
FIG. 10 shows a scheme for categorizing GSM neighbor cells into seven states.

FIG. 10 shows a state diagram of a second scheme 1000 for categorizing the GSM neighbor cells into seven states. These states are defined as follows:

Strong FCCH Unknown state 1010—includes GSM neighbor cells that are among the top M cells and for which the FCCH has not been detected and the number of failed FCCH detection attempts is less than X.

FCCH Unknown state 1020—includes GSM neighbor cells that are not among the top M cells and for which the FCCH has not been detected and the number of failed FCCH detection attempts is less than X.

Strong SCH Unknown state 1030—includes GSM neighbor cells that are among the top M cells and for which the FCCH has been detected and the number of failed SCH decoding attempts is less than Y.

SCH Unknown state 1040—includes GSM neighbor cells that are not among the top M cells and for which the FCCH has been detected and the number of failed SCH decoding attempts is less than Y.

Known Confirmed state 1050—includes GSM neighbor cells for which the FCCH has been detected and the SCH has been decoded within the last T seconds.

Known Unconfirmed state 1060—includes GSM neighbor cells for which the FCCH has been detected and the SCH was decoded more than T seconds ago.

Unknown state 1070—includes GSM neighbor cells with more than X failed FCCH detection attempts or more than Y failed SCH decoding attempts.

For scheme 1000, the GSM neighbor cells are initialized to either Strong FCCH Unknown state 1010 or FCCH Unknown state 1020 depending on their received signal strength. Each GSM neighbor cell can thereafter transition from state to state depending on measurement results and/or other pertinent information. The transition for one GSM neighbor cell is as follows. If the FCCH for this cell is detected, then the cell transitions (1) from Strong FCCH Unknown state 1010 to Strong SCH Unknown state 1030 or (2) from FCCH Unknown state 1020 to SCH Unknown state 1040. If the FCCH for the cell is not detected after X attempts, then the cell transitions to Unknown state 1070. The parameter X is selected to provide the desired performance. For example, the parameter X may be set to 33 to give the terminal at least three attempts at detecting the FCCH for the worst case scenario when the timing for the cell is not known. The cell transitions between states 1010 and 1020 and between states 1030 and 1040 depending on whether or not it is within the top M cells.

From states 1030 and 1040, the cell transitions back to state 1070 if the SCH is not found or cannot be decoded after Y attempts. The cell transitions from states 1030 and 1040 to Known Confirmed state 1050 if the SCH is decoded. The cell remains in state 1050 if the SCH is decoded within T seconds and transitions to Known Unconfirmed state 1060 otherwise. From state 1060, the cell transitions (1) back to state 1050 if the SCH is decoded or (2) to state 1010 or 1020, depending on the received signal strength, if the SCH is not found or cannot be decoded after Z attempts.

In an embodiment, GSM neighbor cells in Strong SCH Unknown state 1030 are given a priority of 1.0, cells in Strong FCCH Unknown state 1010 are given a priority of 2.0, cells in Known Unconfirmed state 1060 are given a priority of 3.0, cells in SCH Unknown state 1040 are given a priority of 4.0, cells in FCCH Unknown state 1020 are given a priority of 5.0, and cells in Unknown state 1070 are given a priority of 6.0, where a lower priority number corresponds to higher priority. GSM neighbor cells in Known Confirmed state 1050 do not need to be measured and are not assigned a priority. In an embodiment, the W-CDMA neighbor cells are given a priority of 5.5 for scheme 1000.

Figure 11:
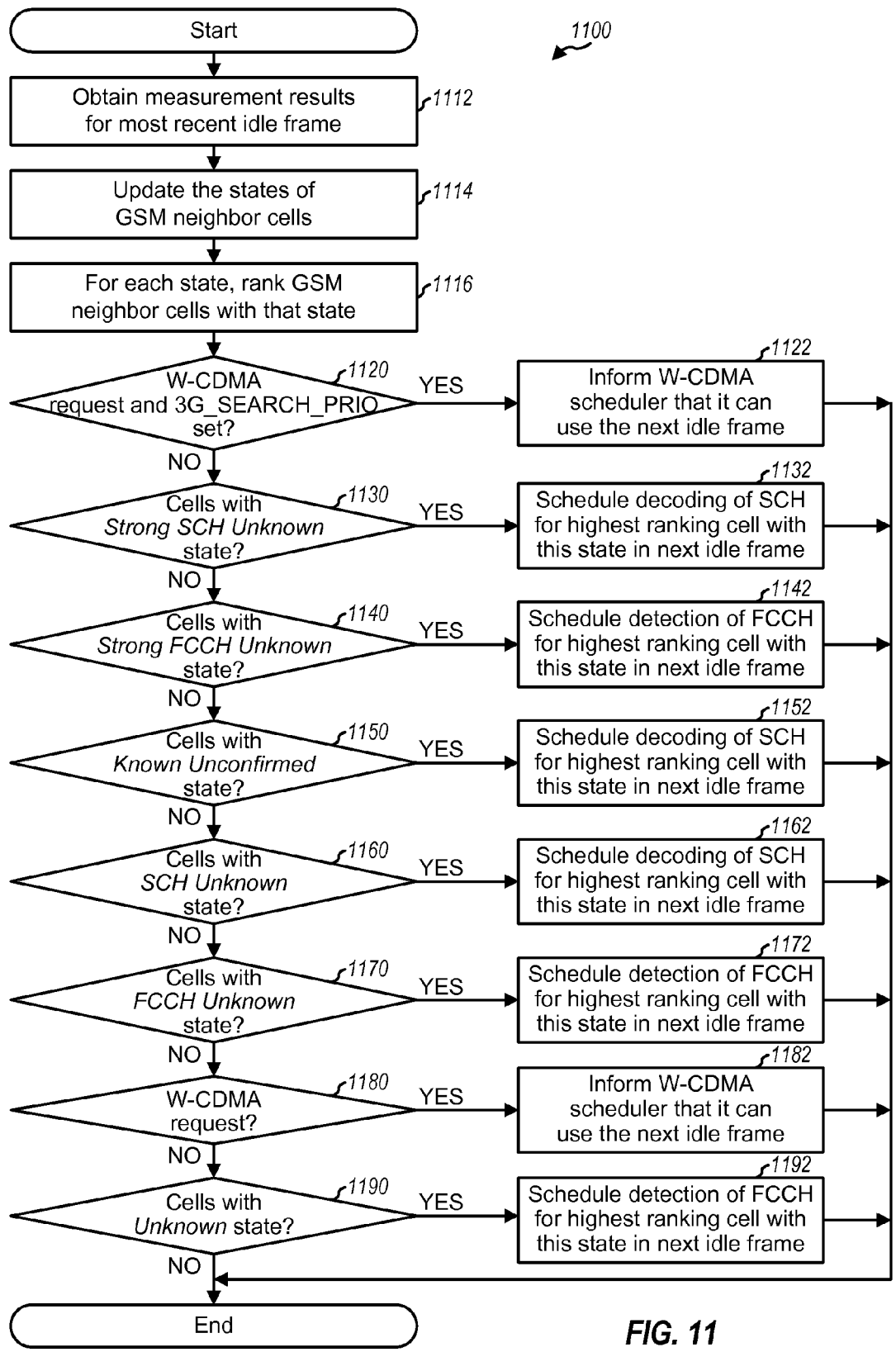
FIG. 11 shows a process for scheduling measurements for GSM and W-CDMA neighbor cells based on the states shown in FIG. 10.

FIG. 11 shows a flow diagram of a process 1100 for scheduling measurements for GSM and W-CDMA neighbor cells. Process 1100 is based on the state diagram shown in FIG. 10 and may be performed after each idle frame.

Measurement results for the most recent idle frame are obtained (block 1112) and used along with other pertinent information to update the states of the GSM neighbor cells (block 1114). For each state, the GSM neighbor cells with that state are ranked (block 1116). The ranking may be based on received signal strength, the amount of elapsed time since the last measurement, cell timing, and so on, as described above. For a given state (e.g., Strong FCCH Unknown state 1010, Strong SCH Unknown state 1030, and so on), cells with that state may be given higher ranking for the first P seconds (e.g., P=5) upon transitioning into the state. The cells in a given state may be ranked based on their received signal strength. The cells in a given state (e.g., Unknown state 1070) may also be ranked in sequential order, with the cell last scheduled for measurement being ranked the highest and the cell most recently scheduled being ranked the lowest. Various ranking schemes may be used to rank the cells, and this is within the scope of the invention.

A determination is then made whether there is a pending W-CDMA request and whether the 3G_SEARCH_PRIO flag is set (block 1120). If the answer is 'yes' for block 1120, then the W-CDMA scheduler is informed that it can use the next idle frame (block 1122).

If the answer is 'no' for block 1120, then a determination is made whether there are any GSM neighbor cells in Strong SCH Unknown state 1030 with an SCH frame potentially aligned with the next idle frame (block 1130). If the answer is 'yes', then the highest-ranking cell that meets the conditions in block 1130 is scheduled for SCH decoding in the next idle frame (block 1132).

If the answer is 'no' for block 1130, then a determination is made whether there are any GSM neighbor cells in Strong FCCH Unknown state 1010 (block 1140). If the answer is 'yes', then the highest-ranking cell with this state is scheduled for FCCH detection in the next idle frame (block 1142).

If the answer is 'no' for block 1140, then a determination is made whether there are any GSM neighbor cells in Known Unconfirmed state 1060 with an SCH frame aligned with the next idle frame (block 1150). If the answer is 'yes', then the highest-ranking cell that meets the conditions in block 1150 is scheduled for SCH decoding in the next idle frame (block 1152).

If the answer is 'no' for block 1150, then a determination is made whether there are any GSM neighbor cells in SCH Unknown state 1040 with an SCH frame potentially aligned with the next idle frame (block 1160). If the answer is 'yes', then the highest-ranking cell that meets the conditions in block 1160 is scheduled for SCH decoding in the next idle frame (block 1162).

If the answer is 'no' for block 1160, then a determination is made whether there are any GSM neighbor cells in FCCH Unknown state 1020 (block 1170). If the answer is 'yes', then the highest-ranking cell with this state is scheduled for FCCH detection in the next idle frame (block 1172).

If the answer is 'no' for block 1170, then a determination is made whether there is a pending W-CDMA request (block 1180). If the answer is 'yes', then the W-CDMA scheduler is informed that it can use the next idle frame (block 1182).

If the answer is 'no' for block 1180, then a determination is made whether there are any GSM neighbor cells in Unknown state 1070, which has the lowest priority for process 1100 (block 1190). If the answer is 'yes', then the highest-ranking cell with this state is scheduled for FCCH detection in the next idle frame (block 1192). Process 1100 terminates after blocks 1122, 1132, 1142, 1152, 1162, 1172, 1182 and 1192 and after a 'no' at block 1190.

FIGS. 7 and 10 show two exemplary schemes 700 and 1000, respectively, for defining the states of the GSM neighbor cells. In general, any number of states and any type of states may be defined, and this is within the scope of the invention. Moreover, the states may be assigned different priorities than those described above. Numerous other schemes for defining the states of GSM neighbor cells may be implemented, and this is within the scope of the invention.

FIGS. 8 and 11 show two exemplary processes 800 and 1100, respectively, for scheduling GSM and W-CDMA neighbor cells for measurements. Other scheduling processes may also be implemented, and this is within the scope of the invention. For simplicity, processes 800 and 1100 show all cells with the same state being assigned the same priority (albeit within different ranking among the cells with that state). For example, in process 1100, all of the cells with Strong FCCH Unknown state 1010 have higher priority than the cells with Known Unconfirmed state 1060. A cell with a lower priority state may also be assigned higher priority than cells with a higher priority state. For example, a cell with Known Unconfirmed state 1060 may be assigned higher priority than cells with states 1010 and 1030 if the SCH for this cell is aligned with the upcoming idle frame.

The techniques described herein may be used to schedule measurements for neighbor cells in multiple wireless communication systems. For clarity, these techniques have been specifically described for GSM and W-CDMA systems. These techniques may also be used for other CDMA and TDMA systems. The CDMA systems may implement IS-2000, IS-856, IS-95, or some other standards, which are known in the art. The neighbor cells for these systems may have state (such as for GSM) or may be stateless (such as for W-CDMA). Appropriate information is maintained for the neighbor cells to ensure that these cells can be scheduled at the appropriate time to achieve the desired performance.

Figure 12:
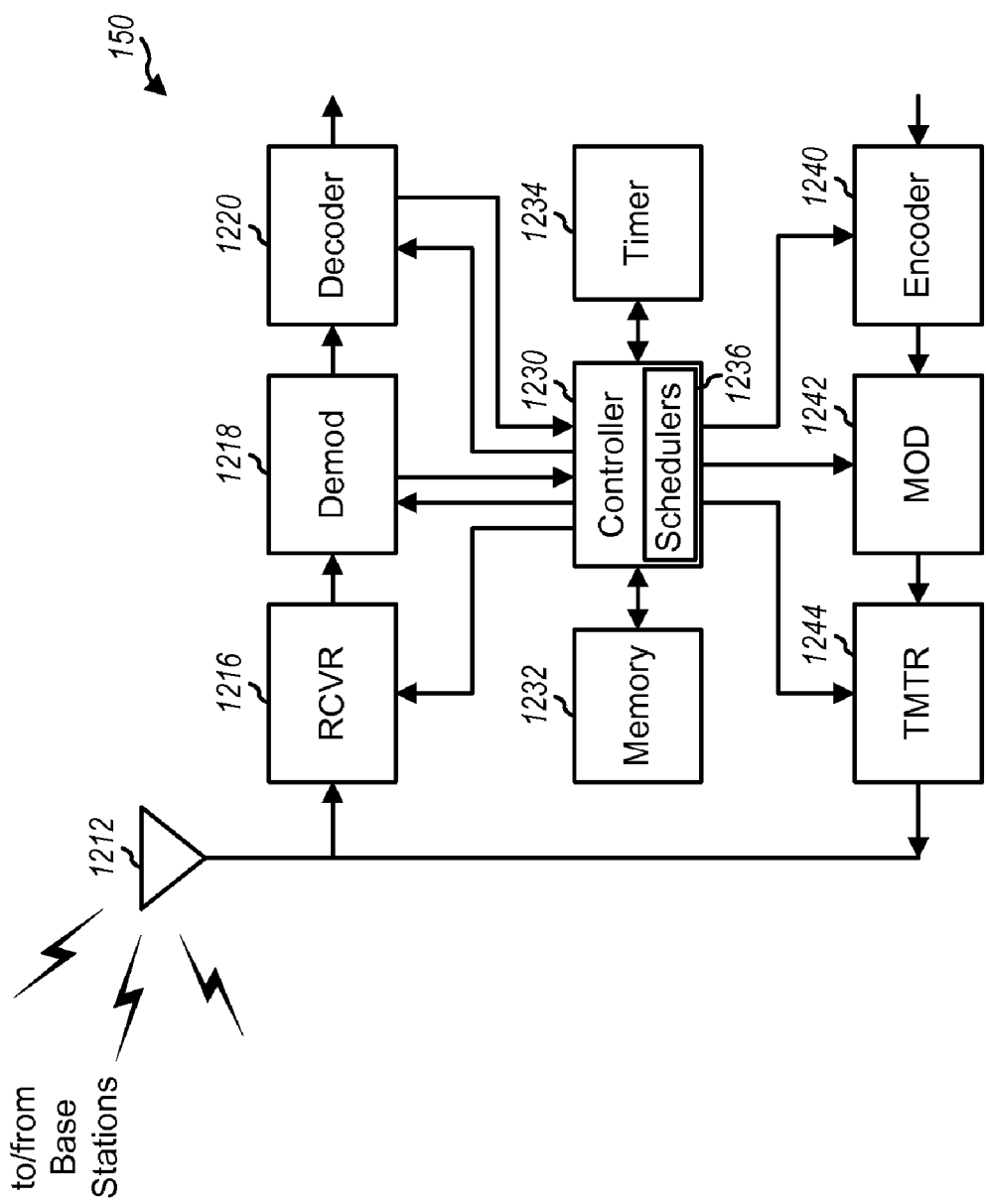
FIG. 12 shows a block diagram of a multi-mode terminal.

FIG. 12 shows a block diagram of an embodiment of multi-mode terminal 150. On the downlink, an antenna 1212 receives modulated signals from GSM and/or W-CDMA base stations (or cells) and provides a received signal to a receiver unit (RCVR) 1216. Receiver unit 1216 conditions (e.g., filters, amplifies, and frequency downconverts) the received signal and further digitizes the conditioned signal and provides data samples. A demodulator (Demod) 1218 processes the data samples and provides demodulated data. A decoder 1220 then deinterleaves and decodes the demodulated data and provides decoded data. The processing by demodulator 1218 and decoder 1220 is typically different for different radio access technologies. For example, demodulator 1218 may perform matched filtering and equalization for GSM. Demodulator 1218 may perform descrambling with PN sequences, despreading with orthogonal variable spreading factor (OVSF) codes, data demodulation, and so on, for W-CDMA. For cell measurement, demodulator 1218 may process the FCCH to obtain timing information for a GSM neighbor cell, and decoder 1220 may process the SCH to obtain cell identification and other information for the GSM neighbor cell.

On the uplink, data (e.g., measurement reports) to be transmitted by terminal 150 is processed (e.g., encoded and interleaved) by an encoder 1240 and further processed (e.g., modulated) by a modulator 1242 in accordance with the applicable radio access technology (e.g., GSM or W-CDMA). A transmitter unit (TMTR) 1244 conditions the modulated data to generate an uplink signal, which is then transmitted via antenna 1212 to one or more base stations (e.g., the serving cell).

A controller 1230 directs operation of various processing units within terminal 150. A memory unit 1232 stores data and program codes used by controller 1230 and other processing units. Controller 1230 implements schedulers 1236, which may include a W-CDMA scheduler, an overall scheduler, and so on. The W-CDMA scheduler determines how often and when data samples need to be collected for W-CDMA frequencies for off-line processing by demodulator 1218 and decoder 1220. The overall scheduler may schedule the neighbor cells for measurements during idle frames based on process 800, 1100, or some other process.

For measurement scheduling, controller 1230 may receive various types of information from other processing units such as, for example, measurement results for previously scheduled neighbor cells (e.g., from demodulator 1218 and/or decoder 1220), received signal strength for the neighbor cells (e.g., from demodulator 1218), and timing information from a timer 1234. Controller 1230 maintains state information for each GSM neighbor cell. The state information may include, for example, the state of the cell, the elapsed time since the last scheduled measurement, the number of failed FCCH detection attempts, the number of failed SCH decoding attempts, the relative received signal strength of the cell (e.g., whether among the top M cells or not), the amount of time since the SCH was last decoded, and so on. Different state information may be maintained for different scheduling processes. For each idle frame, controller 1230 determines and updates the states of the GSM neighbor cells, ranks the GSM neighbor cells with the same state, and selects the highest-ranking GSM cell or W-CDMA frequency for use of the upcoming idle frame.

Timer 1234 provides timing information for controller 1230. For example, for scheme 700, timer 1234 indicates whether N seconds have elapsed for each GSM neighbor cell in Strong SCH Unknown state 720 and SCH Unknown state 730 and whether T seconds have elapsed for each cell in Known Confirmed state 740. For scheme 1000, timer 1234 indicates whether P seconds have elapsed for each GSM neighbor cell in Strong FCCH Unknown state 1010 and Strong SCH Unknown state 1030. The operation of timer 1234 is dependent on the manner in which the states are defined.

The techniques described herein for scheduling measurements of neighbor cells in multiple wireless communication systems may be implemented by various means. For example, these techniques may be implemented in hardware, software, or a combination thereof For a hardware implementation, the processing units used to perform the measurement scheduling may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 1232 in FIG. 12) and executed by a processor (e.g., controller 1230). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus operable to schedule measurement for cells in a plurality of wireless communication systems, comprising:
    a controller operative to categorize cells in a first wireless communication system by associating at least one of said cells in said first wireless communication system with a selected one of a plurality of distinct and predefined states, wherein at least one of said cells in said first wireless communication system is associated with at least one of said plurality of distinct and predefined states based, at least in part, on whether a synchronization channel of said at least one of said cells in said first wireless communication system has been decoded, prioritize said cells in said first wireless communication system based, at least in part, on the distinct and predefined states associated with said cells in said first wireless communication system, prioritize cells in a second wireless communication system relative to the plurality of distinct and predefined states, select a cell in the first system or the second system based on priorities of the cells in the first and second systems, and schedule the selected cell for measurement in next available frame; and
    a demodulator operative to make measurement for the selected cell in the next available frame.

2. The apparatus of claim 1, wherein the controller is operative to update states of the cells in the first system based at least on measurement results obtained from prior frames according to said plurality of distinct and predefined states.

3. The apparatus of claim 2, wherein the controller is operative to update cells in the states of the cells in the first system are further based on information for number of failed attempts to acquire timing information, number of failed attempts to acquire cell identification, and elapsed time since last selection for measurement.

4. The apparatus of claim 1, wherein the controller is further operative to rank cells in the first wireless communication system which are associated with same state, for each of the plurality of distinct and predefined states, and to select a cell for measurement further based on the ranking of the cells in the first system.

5. The apparatus of claim 1 and implemented within a wireless communication device.

6. The apparatus of claim 1, wherein the first and second wireless communication systems utilize different radio access technologies (RATs).

7. The apparatus of claim 1, wherein the first wireless communication system comprises a Global System for Mobile Communications (GSM) system and the second wireless communication system comprises a Wideband Code Division Multiple Access (W-CDMA) system.

8. A method of scheduling measurement for cells in a plurality of wireless communication systems, comprising:
    categorizing cells in a first wireless communication system by associating at least one of said cells in said first wireless communication system with a selected one of a plurality of distinct and predefined states, wherein at least one of said cells in said first wireless communication system is associated with at least one of said plurality of distinct and predefined states based, at least in part, on whether a synchronization channel of said at least one of said cells in said first wireless communication system has been decoded;
    prioritizing said cells in said first wireless communication system based, at least in part, on the plurality of distinct and predefined states associated with said cells in said first wireless communication system;
    prioritizing cells in a second wireless communication system relative to the plurality of distinct and predefined states;
    selecting a cell in the first wireless communication system or the second wireless communication system based on priorities of the cells in the first and second wireless communication systems; and
    scheduling the selected cell for measurement in next available frame.

9. The method of claim 8, wherein the first wireless communication system comprises a Global System for Mobile Communications (GSM) system and the second wireless communication system comprises a Wideband Code Division Multiple Access (W-CDMA) system.

10. The method of claim 8, wherein the cells in the second wireless communication system are periodically scheduled for measurement.

11. The method of claim 8, further comprising:
    updating states of the cells in the first wireless communication system according to said plurality of distinct and predefined states based at least on measurement results obtained from prior frames.

12. The method of claim 8, wherein the cells in the second wireless communication system are given higher priority than the cells in the first wireless communication system if a designated flag is set.

13. The method of claim 8, further comprising:
    ranking cells in the first wireless communication system with same state, for each of the plurality of distinct and predefined states, and wherein the selecting is further based on the ranking of the cells in the first wireless communication system.

14. The method of claim 13, wherein a highest-ranking cell with highest priority is selected for measurement in the next available frame.

15. The method of claim 14, wherein the highest-ranking cell with the highest priority is selected for measurement only if a frame that is used to make the measurement for the cell is potentially aligned with the next available frame.

16. The method of claim 13, wherein the cells in the first wireless communication system with the same state are ranked based on received signal strength.

17. The method of claim 13, wherein the cells in the first wireless communication system with the same state are ranked based on elapsed time since last measurement.

18. An apparatus operable to schedule measurement for cells in a plurality of wireless communication systems, comprising:
means for categorizing cells in a first wireless communication system by associating at least one of said cells in said first wireless communication system with a selected one of a plurality of distinct and predefined states, wherein at least one of said cells in said first wireless communication system is associated with at least one of said plurality of distinct and predefined states based, at least in part, on whether a synchronization channel of said at least one of said cells in said first wireless communication system has been decoded;
means for prioritizing the cells in said first wireless communication system based, at least in part, on the distinct and predefined states associated with said cells in said first wireless communication system;
means for prioritizing cells in a second wireless communication system relative to the plurality of distinct and predefined states;
means for selecting a cell in the first wireless communication system or the second wireless communication system based on priorities of the cells in the first and second wireless communication systems; and
means for scheduling the selected cell for measurement in next available frame.

19. The apparatus of claim 18, further comprising:
means for updating states of the cells in the first wireless communication system based at least on measurement results obtained from prior frames.

20. The apparatus of claim 18, further comprising:
means for ranking cells in the first wireless communication system with same state, for each of the plurality of distinct and predefined states, and wherein a cell in the first wireless communication system or the second wireless communication system is selected further based on the ranking of the cells in the first wireless communication system.

21. A processor readable media for storing instructions operable in a wireless device to, if executed by a processor in said wireless device, direct said wireless device to:
categorize cells in a first wireless communication system by associating at least one of said cells in said first wireless communication system with a selected one of a plurality of distinct and predefined states, wherein at least one of said cells in said first wireless communication system is associated with at least one of said plurality of distinct and predefined states based, at least in part, on whether a synchronization channel of said at least one of said cells in said first wireless communication system has been decoded;
prioritize said cells in said first wireless communication system based, at least in part, on the plurality of states associated with said cells in said first wireless communication system;
prioritize cells in a second wireless communication system relative to the plurality of distinct and predefined states;
select a cell in the first wireless communication system or the second wireless communication system based on priorities of the cells in the first and second wireless communication systems; and
schedule the selected cell for measurement in next available frame.

22. The apparatus of claim 1, wherein at least one of said cells in said first wireless communication system is associated with at least one of said plurality of distinct and predefined states based, at least in part, on whether a frequency connection channel of said at least one of cells in said first wireless communication system is detected.

23. The apparatus of claim 22, wherein said at least one of said cells in said first wireless communication system is associated with said at least one of said plurality of distinct and predefined states based, at least in part, on whether said cell is among a set number of strongest received neighbor cells.

24. The apparatus of claim 1, wherein said at least one of said cells in said first wireless communication system is associated with said at least one of said plurality of distinct and predefined states based, at least in part, whether said synchronization channel is decoded with the last T seconds.

25. The apparatus of claim 1, wherein said at least one of said cells in said first wireless communication system is associated with said at least one of said plurality of distinct and predefined states based, at least in part, whether said synchronization channel is decoded more than T seconds ago.

* * * * *